(12) United States Patent
Huang et al.

(10) Patent No.: US 6,509,666 B1
(45) Date of Patent: Jan. 21, 2003

(54) MOTOR STRUCTURE

(75) Inventors: Wen-shi Huang, Taoyan Shien (TW);
Kuo-cheng Lin, Taoyan Shien (TW);
Chu-hsien Chou, Taoyan Shien (TW);
Ming-shi Tsai, Taoyan Shien (TW)

(73) Assignee: Delta Electronics, Inc. (TW)

( * ) Notice: Subject to any disclaimer, the term of this patent is extended or adjusted under 35 U.S.C. 154(b) by 22 days.

(21) Appl. No.: 09/676,266

(22) Filed: Sep. 28, 2000

(30) Foreign Application Priority Data

Jul. 7, 2000 (TW) ........................................ 89113642 A

(51) Int. Cl.$^7$ ............................. H02K 1/12; H02K 3/00; H02K 21/12
(52) U.S. Cl. ........................ 310/254; 310/216; 310/268; 310/90; 310/67 R
(58) Field of Search ................................ 310/67 R, 68 R, 310/254, 216, 266, 90, 181, 91, 164, 49 R, 268; 29/596–598; 360/99.07, 99.08, 99.04, 98.07

(56) References Cited

U.S. PATENT DOCUMENTS

| | | | | | |
|---|---|---|---|---|---|
| 4,246,504 A | * | 1/1981 | Clifford et al. | ............. | 310/181 |
| 4,459,501 A | * | 7/1984 | Fawzy | ......................... | 310/268 |
| 4,949,000 A | * | 8/1990 | Petersen | ...................... | 310/179 |
| 5,193,084 A | * | 3/1993 | Christiaens | ............... | 360/99.08 |
| 5,559,382 A | * | 9/1996 | Oku et al. | ..................... | 310/90 |
| 5,780,944 A | * | 7/1998 | Sakamoto | ................. | 310/49 R |
| 5,808,390 A | * | 9/1998 | Miyazawa et al. | .......... | 310/194 |
| 5,831,356 A | * | 11/1998 | Aoshima | ................... | 310/49 R |
| 5,854,526 A | * | 12/1998 | Sakamoto | .................... | 310/254 |
| 5,945,765 A | * | 8/1999 | Chen | .......................... | 310/257 |
| 6,172,440 B1 | * | 1/2001 | Sasaki et al.. | .............. | 310/156 |
| 6,285,108 B1 | * | 9/2001 | Horng | ........................ | 310/259 |
| 6,320,294 B1 | * | 11/2001 | Kliman | ....................... | 310/257 |

* cited by examiner

Primary Examiner—Tran Nguyen
(74) Attorney, Agent, or Firm—Martine & Penilla, LLP

(57) ABSTRACT

A motor structure including a stator having a coil assembly, and a rotor having a circular magnet located above the coil. The stator includes a coil assembly having a ring-shaped slot, a plurality of first teeth, a plurality of second teeth, and a coil. The ring-shaped slot has an inner periphery on its inner side and an outer periphery on its outer side away from the inner periphery. The plurality of first teeth is mounted around the inner periphery of the ring-shaped slot. The plurality of second teeth is mounted around the outer periphery of the ring-shaped slot. The coil is wound in the ring-shaped slot.

8 Claims, 4 Drawing Sheets

MOTOR STRUCTURE

BACKGROUND OF THE INVENTION

1. Field of the Invention

The invention relates to a motor structure, in particular, to a thin motor structure.

2. Description of the Related Art

Recently, electrical products tend to be small size and thin. For example, notebook computers are getting thinner and thinner. To meet the demand of thin electrical products, a thin fan motor structure must be obtained.

In developing a thin motor structure, the most important problem is that the stator structure of the conventional motor cannot meet the demands of the designer, and there are difficulties in manufacturing a thin conventional stator structure.

FIG. 1 is a partial cross-sectional view showing a conventional motor structure. FIG. 2 is a front view showing the motor structure as shown in FIG. 1. Referring to FIGS. 1 and 2, the motor structure includes a magnet ring 100 and a stator 200. The magnet ring 100 is a part of a rotor (not completely shown). The stator 200 includes a silicon steel sheet set 201 with four poles and a coil (wirings) 202 of the silicon steel sheet set 201.

Since the silicon steel sheet set 201 is composed of a plurality of silicon steel sheets stacked together, the edges of the silicon steel sheet set 201 are sharp. Therefore, a film or cover (not shown) is needed to cover the silicon steel sheet 201 for winding the wirings 202 without damaging them.

In the above-mentioned motor structure, the method of winding the coil wastes a lot of space, that is, the coil cannot totally fill the circular area surrounded by the silicon steel sheet set 201, deteriorating the performance of the motor.

In order to make the above-mentioned motor structure thin, there may occur the following effects:

(a) since the number of the silicon steel sheets must be relatively small and the space for the winding is not sufficient, the motor performance is relatively poor;

(b) since the size of the stator is relatively small and the tolerance is relatively strict, the difficulty level is increased in manufacturing and assembling the motor; and (c) since the edges of the silicon steel sheet set of a thin stator are relatively sharp, the wirings wound thereon are easily damaged and short-circuit the coil.

In general, the stability of the operating motor improves as the number of poles for the motor increases. In the above-mentioned motor structure, the number of poles thereof is four. If the number of poles is increased to eight, undesirable effects occur. For example, difficulty in winding the wiring may occur. Also in a condition that seldom occurs, the motor may easily short out or the performance thereof will be poor.

SUMMARY OF THE INVENTION

It is therefore an object of the invention to provide a thin motor structure capable of improving the performance of the motor and facilitating the manufacturing processes.

According to one aspect of the invention, a motor structure includes a stator having a coil assembly, and a rotor having a circular magnet located above the coil. The stator includes a coil assembly having a ring-shaped slot, a plurality of first teeth, a plurality of second teeth, and a coil. The ring-shaped slot has an inner periphery on its inner side and an outer periphery on its outer side away from the inner periphery. The plurality of first teeth is mounted around the inner periphery of the ring-shaped slot. The plurality of second teeth is mounted around the outer periphery of the ring-shaped slot. The coil is wound in the ring-shaped slot.

The above-mentioned motor structure may further include a base. The coil assembly is mounted on the base. In addition, a ring-shaped concavity may be formed on the base for the coil assembly to be mounted therein.

Furthermore, the stator may further include a static shaft substantially perpendicular to, and fixed on the base. In this case, a ring-shaped groove may be formed around the static shaft. Alternatively, the rotor may further include a hub in which a through hole is formed, a metal sheet arranged between the hub and the circular magnet, and a bearing positioned in the through hole and being penetrated by the static shaft. Moreover, the motor structure may further include an engagement ring positioned in the through hole and on the bearing for fixing the bearing, and an elastic ring positioned in the ring-shaped groove for elastically fixing the bearing.

DETAILED DESCRIPTION OF THE INVENTION

The preferred embodiments of the invention will be described in detail with reference to FIGS. 3 to.

Figure 1:
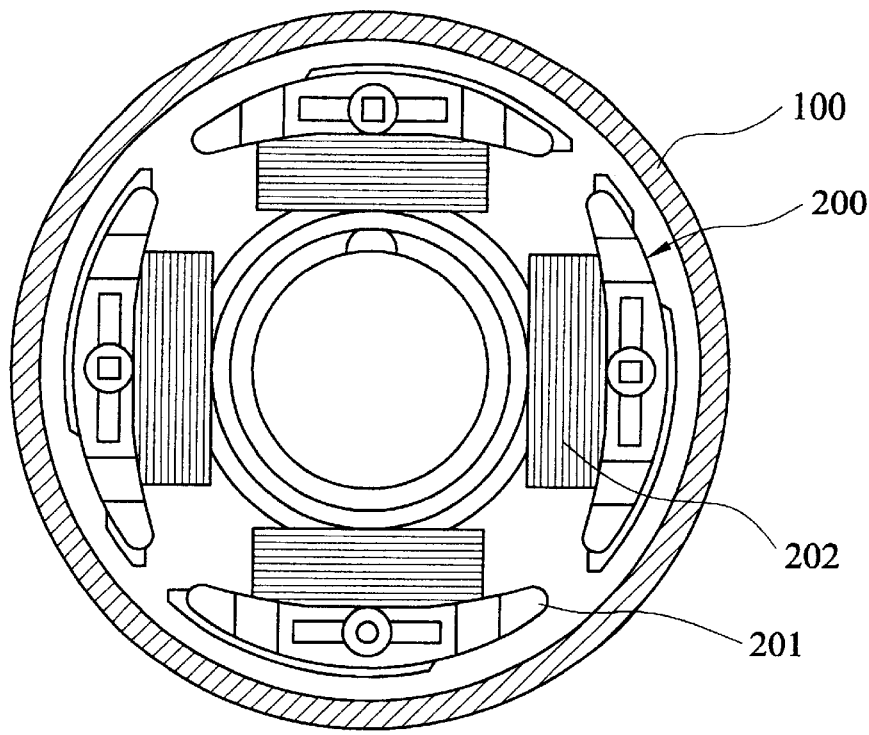
FIG. 1 is a partial cross-sectional view showing a conventional motor structure.
Figure 2:
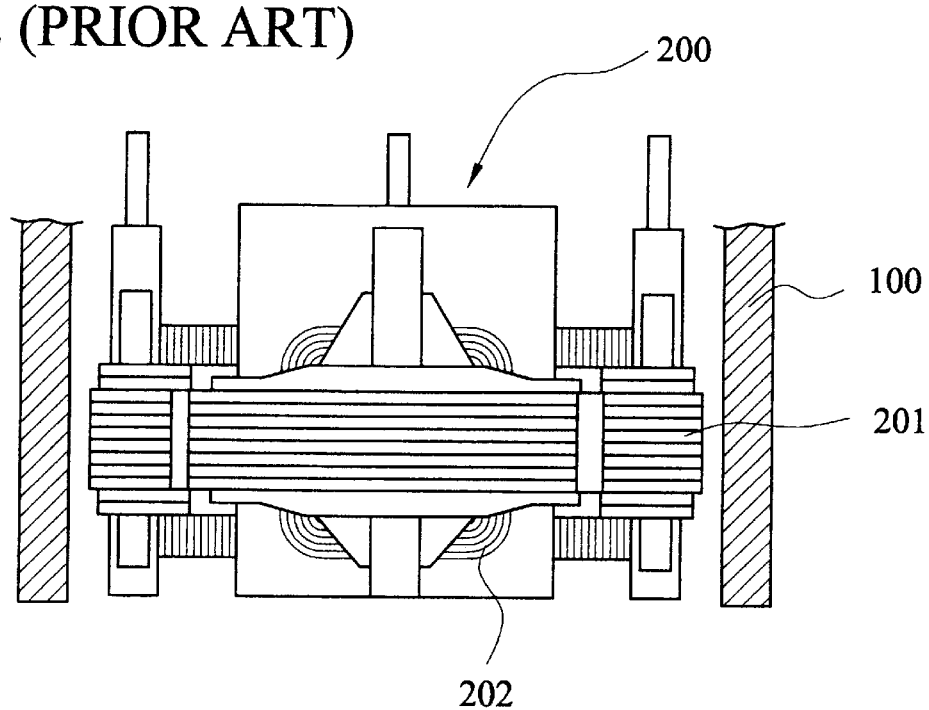
FIG. 2 is a front view showing the motor structure as shown in FIG. 1.
Figure 3:
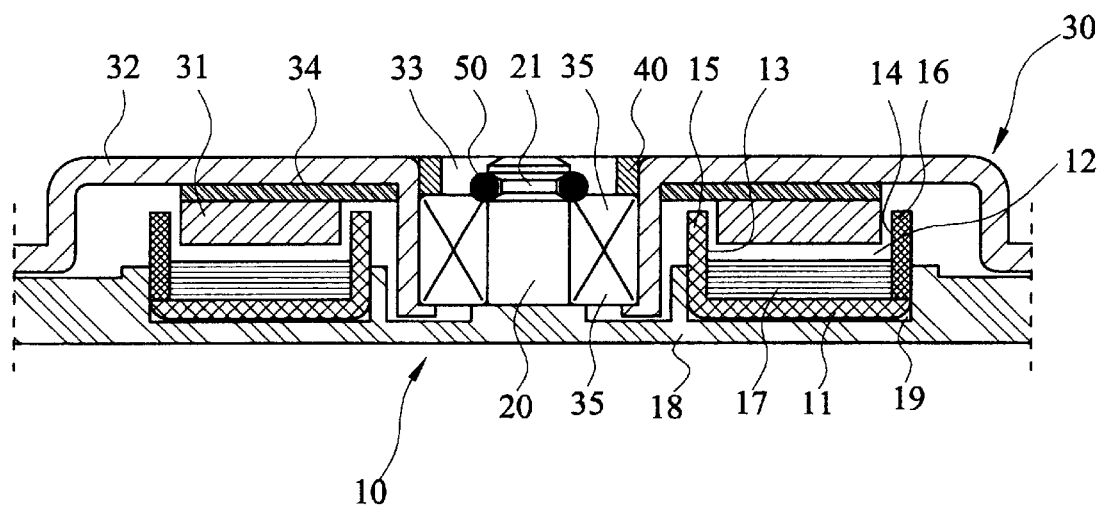
FIG. 3 is a partial cross-sectional view showing a motor structure in accordance with a preferred embodiment of the invention.

FIG. 3 is a partial cross-sectional view showing a motor structure in accordance with a preferred embodiment of the invention. Referring to FIG. 3, the motor structure includes a stator 10 and a rotor 30. The stator 10 includes a coil assembly 11 and a base 18. The coil assembly 11 includes a ring-shaped slot 12, four first teeth 15, four second teeth 16; and a coil (wirings) 17. The ring-shaped slot 12 has an inner periphery 13 on its inner side and an outer periphery 14 on its outer side away from the inner periphery. The first teeth 15 function as the silicon steel sheets are formed around the inner periphery 13 of the ring-shaped slot 12. The second teeth 16 also functionas another silicon steel sheets are formed around the outer periphery 14 of the ring-shaped slot 12. Each of the second teeth 16 and the corresponding first tooth 15 are alternately arranged with respect to the center of the ring-shaped slot 12 (described later). The coil 17 is wound in the ring-shaped slot 12. The rotor 30 includes a circular magnet 31 located above the coil 17.

In addition, a ring-shaped concavity 19 is formed on the base 18 for the coil assembly 11 to be mounted therein.

Furthermore, the stator 10 further includes a static shaft 20 substantially perpendicular to, and fixed on the base 18. A ring-shaped groove 21 is formed on the static shaft 20. The rotor 30 further includes a hub (e.g. a hub of an impeller) 32, a metal sheet (e.g. an iron sheet) 34, and a bearing 35. A through hole 33 is formed in the hub 32. The metal sheet 34 is arranged between the hub 32 and the circular magnet 31. The bearing 35 is positioned in the through hole 33 and is penetrated by the static shaft 20.

The motor structure may further include an engagement ring (e.g. a copper sleeve) 40 and an elastic ring (e.g. an O-ring) 50. The engagement ring 40 is positioned in the through hole 33 and on the bearing 35 for fixing the bearing 35. The elastic ring 50 is positioned in the ring-shaped groove 21 for elastically fixing the bearing 35.

It should be noted that in the motor structure, the static shaft 20 remains static while the hub 32 and the bearing 35 rotate around each other. The engagement ring 40 and the elastic ring 50 are used to fix the bearing 35 so as to prevent the bearing 35 and the static shaft 20 from separating along the axial direction of the static shaft 20.

Figure 4:
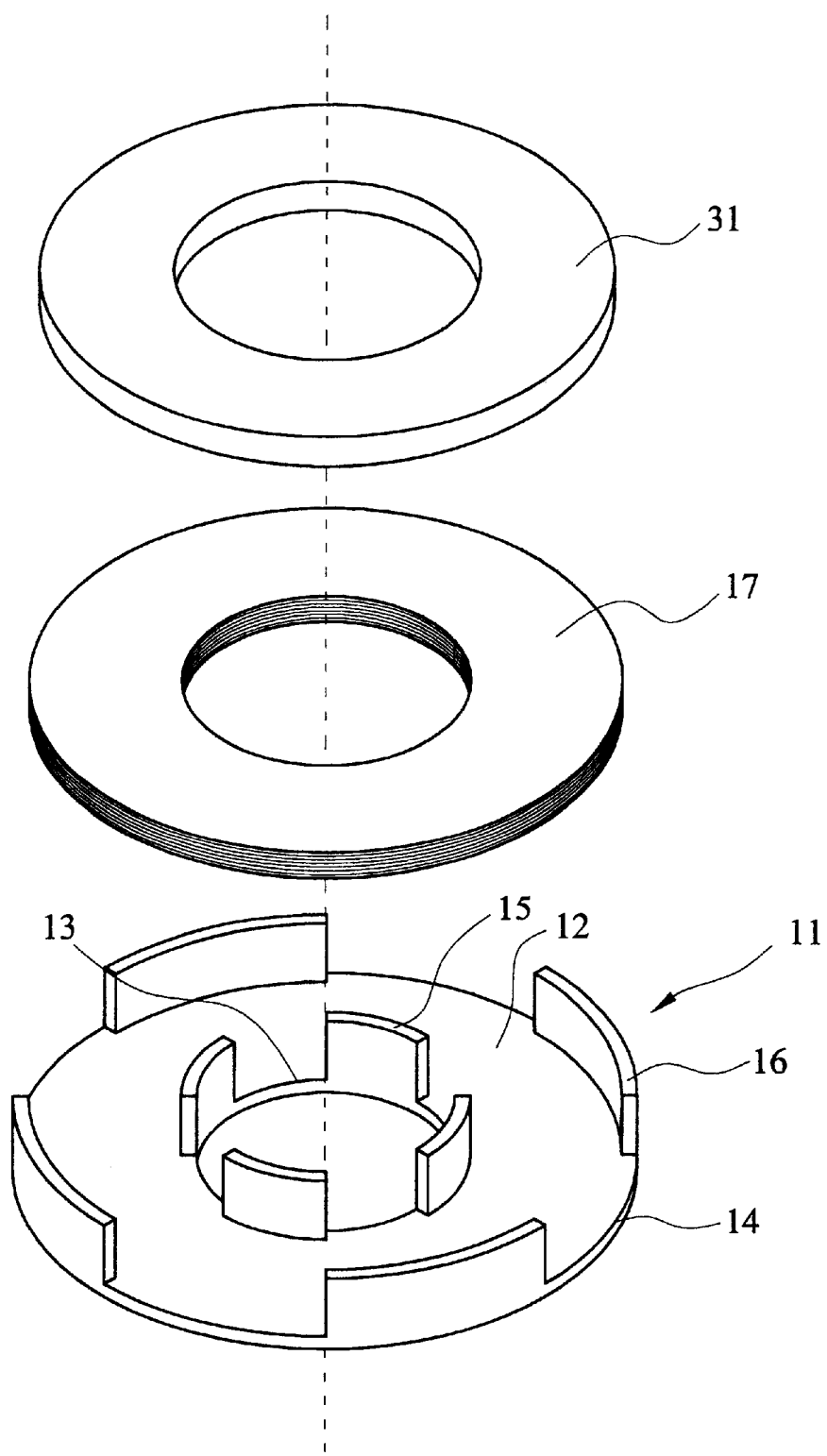
FIG. 4 is a partial exploded view showing the motor structure in accordance with the preferred embodiment of the invention.

FIG. 4 is an exploded view showing the coil assembly 11, coil 17, and circular magnet 31 as shown in FIG. 3. The structure of the coil assembly 11 can be clearly seen with reference to FIG. 4, and it is obvious that one of the second teeth 16 and its corresponding first tooth 15 are alternately arranged with respect to the center of the ring-shaped slot 12. The first teeth 15 and the second teeth 16 define the ring-shaped slot 12. The coil 17 is wound in the ring-shaped slot 12, and the circular magnet 31 is located above the coil 17.

Figure 5:
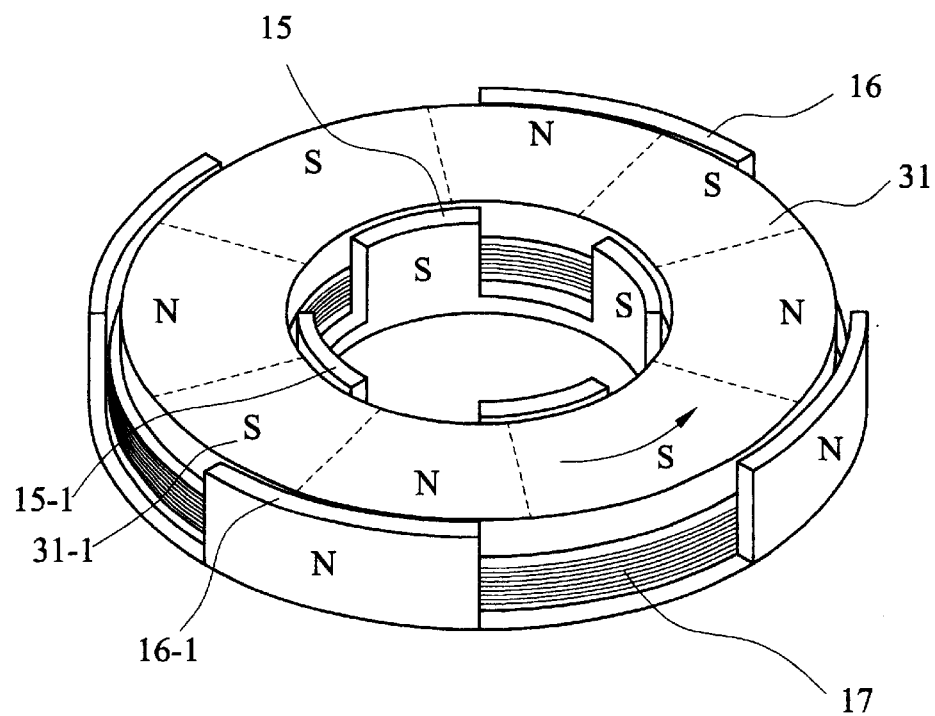
FIG. 5 shows a partial operating condition of the motor structure as shown in FIG. 4.

FIG. 5 shows a partial operating condition of the motor structure as shown in FIG. 4. Referring to FIG. 5, the circular magnet 31 is magnetized into eight magnet sections such as N, S, . . . , N, S. When starting the motor, the four first teeth 15 are magnetized into magnet section S while the four second teeth 16 are magnetized into magnet section N.

For the sake of better understanding the invention, a description is given with reference to the first tooth 15-1, the second tooth 16-1, the magnet section 31-1, and the magnet section N or S indicated in the drawing.

In this case, the first tooth 15-1 repels the magnet section 31-1, and the second tooth 16-1 attracts the magnet section 31-1. Therefore, the circular magnet 31 turns in a predetermined angle in a counterclockwise direction, as indicated by the arrow. Then, the current flowing through the coil is inverted to magnetize the four first teeth 15 into magnet sections N and the four second tooth 16 into magnet sections S. Similarly, the circular magnet 31 turns along the direction of the arrow under the influence of both the repelling and attraction of both the second teeth 16 and the first tooth 15.

The effects of the invention will be described in the following.

Since the coil 17 is directly wound in the ring-shaped slot 12 of the coil assembly 11, the winding is easy and there does not exist the problem of wasting the winding space as shown in the prior art.

Furthermore, since the ring-shaped slot 12 has a circular surface for winding, no sharp edges exist to damage the coil 17 in accordance with the invention.

Moreover, since the winding is simplified in the invention, the number of poles can be increased to improve the stability of the motor.

While the invention has been described by way of example and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications. For instance, the number of the first tooth 15 or the second tooth 16 is not limited to four. Moreover, the ring-shaped concavity 19 also can be removed. In this case, the coil assembly 11 can be mounted on the base 18 to function normally.

Figure 6:
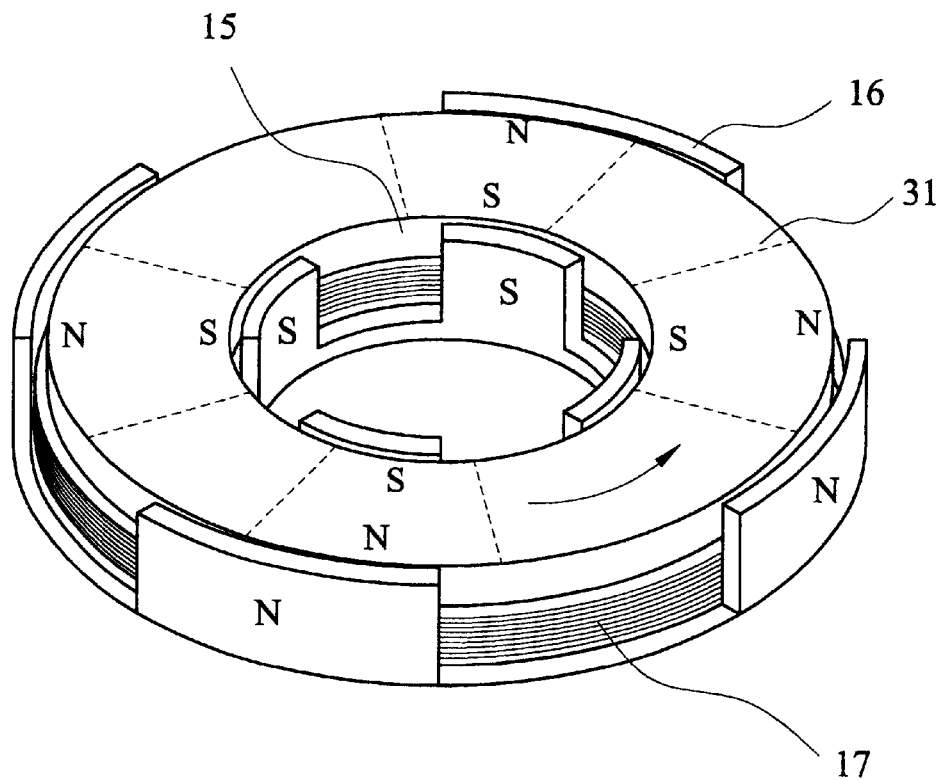
FIG. 6 shows a partial operating condition of the motor structure in accordance with another embodiment of the invention.

Furthermore, although each of the first teeth 15 and the corresponding second tooth 16 are alternately arranged with respect to the center of the ring-shaped slot 12, it is allowable that each of the first teeth 15 and the corresponding second tooth are radially aligned with respect to the center of the ring-shaped slot 12, as shown in FIG. 6. In this case, the magnetization method of the circular magnet 31 can be changed and the motor will function normally.

Figure 7:
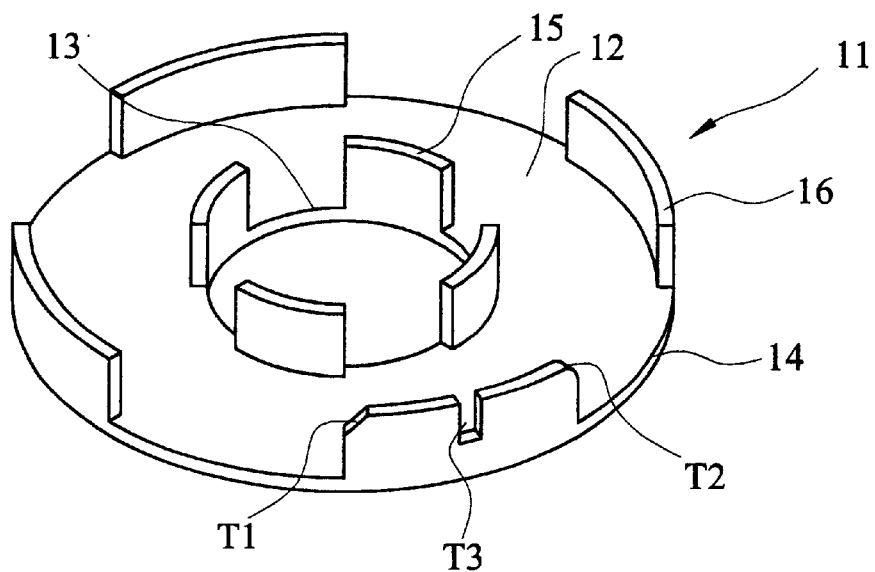
FIG. 7 shows the structure of a coil assembly in accordance with another embodiment of the invention.

Alternatively, in order to advantageously adjust the angle of magnetic inclination to start the rotor, the first teeth 15 and second teeth 16 can be formed in different shapes. They are chamfered teeth T1, teeth with round top corners T2, teeth with indentations T3, or any other suitable shapes, or in different sizes, as shown in FIG. 7.

What is claimed is:

1. A motor structure comprising:
   a base;
   a stator, comprising:
      a coil assembly being mounted on said base, including:
         a ring-shaped slot having an inner periphery on its inner side and an outer periphery on its outer side away from said periphery;
         a plurality of first teeth mounted around said inner periphery of said ring-shaped slot;
         a plurality of second teeth mounted around said outer periphery of said ring-shaped slot, wherein said first teeth and said second teeth being radially aligned; and
         a coil wound in said ring-shaped slot;
      a static shaft substantially perpendicular to and fixed on said base; and
      a ring-shaped groove being formed around said static shaft;
   a rotor, including:
      a circular magnet located above said coil;
      a hub in which a through hole is formed;
      a metal sheet arranged between said hub and said circular magnet; and
      a bearing positioned in said through hole and being penetrated by said static shaft;
      an engagement ring positioned in said through hole and on said bearing for fixing said bearing; and
      an elastic ring positioned in said ring-shaped groove for elastically fixing said bearing.

2. The motor according to claim 1, wherein said teeth shapes are selected as one configuration from a group consisting of chamfered teeth, teeth with round top corners, and teeth with indentations.

3. A motor structure comprising:
   a stator having a coil assembly, said coil assembly including:
      a ring-shaped slot having an inner periphery on its inner side and an outer periphery on its outer side away from said inner periphery;
      a plurality of first teeth mounted around said inner periphery of said ring-shaped slot;

a plurality of second teeth mounted around said outer periphery of said ring-shaped slot, wherein said first teeth and said second teeth being alternately arranged; and a coil wound in said ring-shaped slot; and a rotor including a circular magnet located above said coil.

4. The motor structure according to claim 3, further comprising a base, said coil assembly being mounted on said base.

5. The motor structure according to claim 4, wherein a ring-shaped concavity is formed on said base for said coil assembly to be mounted therein.

6. The motor structure according to claim 4, wherein said teeth shapes are selected as one configuration from a group consisting of chamfered teeth, teeth with round top corners, and teeth with indentations.

7. The motor structure according to claim 4, wherein:

said stator further comprising a static shaft substantially perpendicular to, and fixed on said base, a ring-shaped groove being formed around said static shaft;

said rotor further comprising:

a hub in which a through hole is formed;

a metal sheet arranged between said hub and said circular magnet; and a bearing positioned in said through hole and being penetrated by said static shaft; and said motor structure further comprising:

an engagement ring positioned in said through hole and on said bearing for fixing said bearing; and an elastic ring positioned in said ring-shaped groove for elastically fixing said bearing.

8. The motor structure according to claim 5, wherein said teeth shapes are selected as one configuration from a group consisting of chamfered teeth, teeth with round top corners, and teeth with indentations.

* * * * *